(12) United States Patent
Nagatani et al.

(10) Patent No.: US 7,007,473 B2
(45) Date of Patent: Mar. 7, 2006

(54) TEMPERATURE CONTROL DEVICE OF EVAPORATOR

(75) Inventors: Shuji Nagatani, Wako (JP); Tsuyoshi Baba, Wako (JP); Shigeru Ibaraki, Wako (JP); Akihisa Sato, Wako (JP); Susumu Maeda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/490,766

(22) PCT Filed: Sep. 20, 2002

(86) PCT No.: PCT/JP02/09724

§ 371 (c)(1),
(2), (4) Date: Oct. 12, 2004

(87) PCT Pub. No.: WO03/029619

PCT Pub. Date: Apr. 10, 2003

(65) Prior Publication Data

US 2005/0050909 A1    Mar. 10, 2005

(30) Foreign Application Priority Data

Sep. 28, 2001 (JP) ............................. 2001-301626

(51) Int. Cl.
- *F01K 23/10* (2006.01)
- *F01N 5/02* (2006.01)
- *F02G 3/00* (2006.01)
- *F02G 5/02* (2006.01)
- *F22B 1/18* (2006.01)

(52) U.S. Cl. ........................... 60/616; 60/615; 60/618; 60/655; 60/660

(58) Field of Classification Search .................. 60/616, 60/618, 655, 660, 615
See application file for complete search history.

(56) References Cited

U.S. PATENT DOCUMENTS

| | | | |
|---|---|---|---|
| 4,586,338 A * | 5/1986 | Barrett et al. | 60/618 |
| 5,896,746 A * | 4/1999 | Platell | 60/618 |
| 6,810,668 B1 * | 11/2004 | Nagatani et al. | 60/618 |
| 6,845,618 B1 * | 1/2005 | Niikura et al. | 60/618 |

FOREIGN PATENT DOCUMENTS

| | | | |
|---|---|---|---|
| JP | 60-64101 A | | 4/1985 |
| JP | 2-38161 | * | 10/1990 |
| JP | 2-38162 | * | 10/1990 |
| JP | 2002-115801 A | | 4/2002 |

* cited by examiner

*Primary Examiner*—Sheldon J Richter
(74) *Attorney, Agent, or Firm*—Birch, Stewart, Kolasch & Birch, LLP

(57) ABSTRACT

Evaporator temperature control means (U) that, in order to make the temperature of steam generated by heating water using exhaust gas of an engine coincide with a target temperature, controls the amount of water supplied to the evaporator based on the flow rate of the exhaust gas, the temperature of the exhaust gas, the temperature of the water, and the temperature of the steam. Calculating an exhaust gas flow rate (Gmix) based on a fuel injection quantity, an air/fuel ratio, and a rotational speed of the engine improves the precision and the responsiveness of the calculation. Controlling the amount of water supplied to the evaporator based on this exhaust gas flow rate (Gmix) therefore improves the accuracy with which the steam temperature is controlled so as to make it coincide with the target temperature.

8 Claims, 8 Drawing Sheets

TEMPERATURE CONTROL DEVICE OF EVAPORATOR

FIELD OF THE INVENTION

The present invention relates to an evaporator temperature control system that, in order to make the temperature of a gas-phase working medium generated by heating a liquid-phase working medium using exhaust gas of an engine coincide with a target temperature, controls the supply of the liquid-phase working medium based on the flow rate of the exhaust gas, the temperature of the exhaust gas, the temperature of the liquid-phase working medium, and the temperature of the gas-phase working medium.

BACKGROUND ART

An arrangement in which the exhaust gas of a diesel engine is guided to an evaporator so as to heat water and generate steam, and the pressure energy and the thermal energy of this steam are used to operate an expander and generate mechanical energy is known from Japanese Patent Application Laid-open No. 60-64101. In this arrangement the flow rate of the exhaust gas is used as one of the parameters with which control is carried out in order to make the temperature of the steam generated in the evaporator coincide with a target steam temperature, and this exhaust gas flow rate is estimated based on the position of a fuel rack of the engine.

Furthermore, the present applicant has proposed in Japanese Patent Application No. 2000-311680 an arrangement in which the energy of exhaust gas is calculated based on the intake negative pressure and the rotational speed of an engine, and an amount of feedforward for controlling the amount of water supplied to an evaporator is calculated based on this exhaust gas energy.

However, in the arrangement disclosed in Japanese Patent Application Laid-open No. 60-64101, due to a delay in pumping fuel and a mechanical delay in a governor mechanism, the amount of fuel supplied does not respond quickly to a change in the engine rotational speed, and it is difficult to estimate with high precision the flow rate of the exhaust gas when the output of the engine changes.

Moreover, in the arrangement proposed in Japanese Patent Application No. 2000-311680, since the intake negative pressure of the engine is used when calculating the feedforward value for controlling the amount of water supplied, it is necessary to change the parameters for calculating the amount of water supplied in accordance with engine specifications (displacement, exhaust port shape, combustion chamber shape).

DISCLOSURE OF THE INVENTION

The present invention has been achieved under the above-mentioned circumstances, and it is an object thereof to calculate with high precision and good responsiveness the flow rate of exhaust gas of an engine, the flow rate being a parameter for controlling the amount of water supplied to an evaporator that carries out heat exchange with the exhaust gas.

In order to achieve this object, in accordance with a first aspect of the present invention there is proposed an evaporator temperature control system that, in order to make the temperature of a gas-phase working medium generated by heating a liquid-phase working medium using exhaust gas of an engine coincide with a target temperature, controls the supply of the liquid-phase working medium based on the flow rate of the exhaust gas, the temperature of the exhaust gas, the temperature of the liquid-phase working medium, and the temperature of the gas-phase working medium, the system including fuel injection quantity detection means for detecting a fuel injection quantity of the engine; air/fuel ratio detection means for detecting an air/fuel ratio of the engine; and rotational speed detection means for detecting a rotational speed of the engine; the exhaust gas flow rate being determined by calculation based on the fuel injection quantity, the air/fuel ratio, and the rotational speed.

In accordance with this arrangement, since the flow rate of the exhaust gas is determined by calculation based on the fuel injection quantity, the air/fuel ratio, and the rotational speed, which are parameters that indicate the operating conditions of the engine, the flow rate of the exhaust gas can be determined with high precision and good responsiveness, and by controlling the amount of the liquid-phase working medium supplied to the evaporator based on this exhaust gas flow rate, the accuracy with which the temperature of the gas-phase working medium is controlled so as to make it coincide with the target temperature can be improved.

Furthermore, in accordance with a second aspect of the present invention, there is proposed an evaporator temperature control system that, in order to make the temperature of a gas-phase working medium generated by heating a liquid-phase working medium using exhaust gas of an engine coincide with a target temperature, controls the supply of the liquid-phase working medium based on the flow rate of the exhaust gas, the temperature of the exhaust gas, the temperature of the liquid-phase working medium, and the temperature of the gas-phase working medium, the system including fuel injection quantity detection means for detecting a fuel injection quantity of the engine; and intake air volume detection means for detecting an intake air volume of the engine; the exhaust gas flow rate being determined by calculation based on the fuel injection quantity and the intake air volume.

In accordance with this arrangement, since the flow rate of the exhaust gas is determined by calculation based on the fuel injection quantity and the intake air volume, which are parameters that indicate the operating conditions of the engine, the flow rate of the exhaust gas can be determined with high precision and good responsiveness, and by controlling the amount of the liquid-phase working medium supplied to the evaporator based on this exhaust gas flow rate, the accuracy with which the temperature of the gas-phase working medium is controlled so as to make it coincide with the target temperature can be improved.

Moreover, in accordance with a third aspect of the present invention, there is proposed an evaporator temperature control system that, in order to make the temperature of a gas-phase working medium generated by heating a liquid-phase working medium using exhaust gas of an engine coincide with a target temperature, controls the supply of the liquid-phase working medium based on the flow rate of the exhaust gas, the temperature of the exhaust gas, the temperature of the liquid-phase working medium, and the temperature of the gas-phase working medium, the system including intake air volume detection means for detecting an intake air volume of the engine; and air/fuel ratio detection means for detecting an air/fuel ratio of the engine; the exhaust gas flow rate being determined by calculation based on the intake air volume and the air/fuel ratio.

In accordance with this arrangement, since the flow rate of the exhaust gas is determined by calculation based on the intake air volume and the air/fuel ratio, which are parameters that indicate the operating conditions of the engine, the exhaust gas flow rate can be calculated with high precision and good responsiveness, and by controlling the amount of the liquid-phase working medium supplied to the evaporator based on this exhaust gas flow rate, the accuracy with which the temperature of the gas-phase working medium is controlled so as to make it coincide with the target temperature can be improved.

BRIEF DESCRIPTION OF THE DRAWINGS

FIG. 1 is a diagram showing the overall arrangement of a steam temperature control system for an evaporator;

FIG. 2 is a block diagram of the steam temperature control system for the evaporator;

FIG. 3 is a block diagram of the control system;

FIG. 4 is a flow chart for explaining the operation;

FIG. 5 is a map for looking up the heat exchange efficiency from the exhaust gas temperature and the exhaust gas flow rate; and FIG. 6 is a map for looking up, from a water supply feedback value, a voltage to be applied to a water supply regulation actuator.

BEST MODE FOR CARRYING OUT THE INVENTION

The first embodiment of the present invention is explained below with reference to FIG. 1 to FIG. 6.

Figure 1:
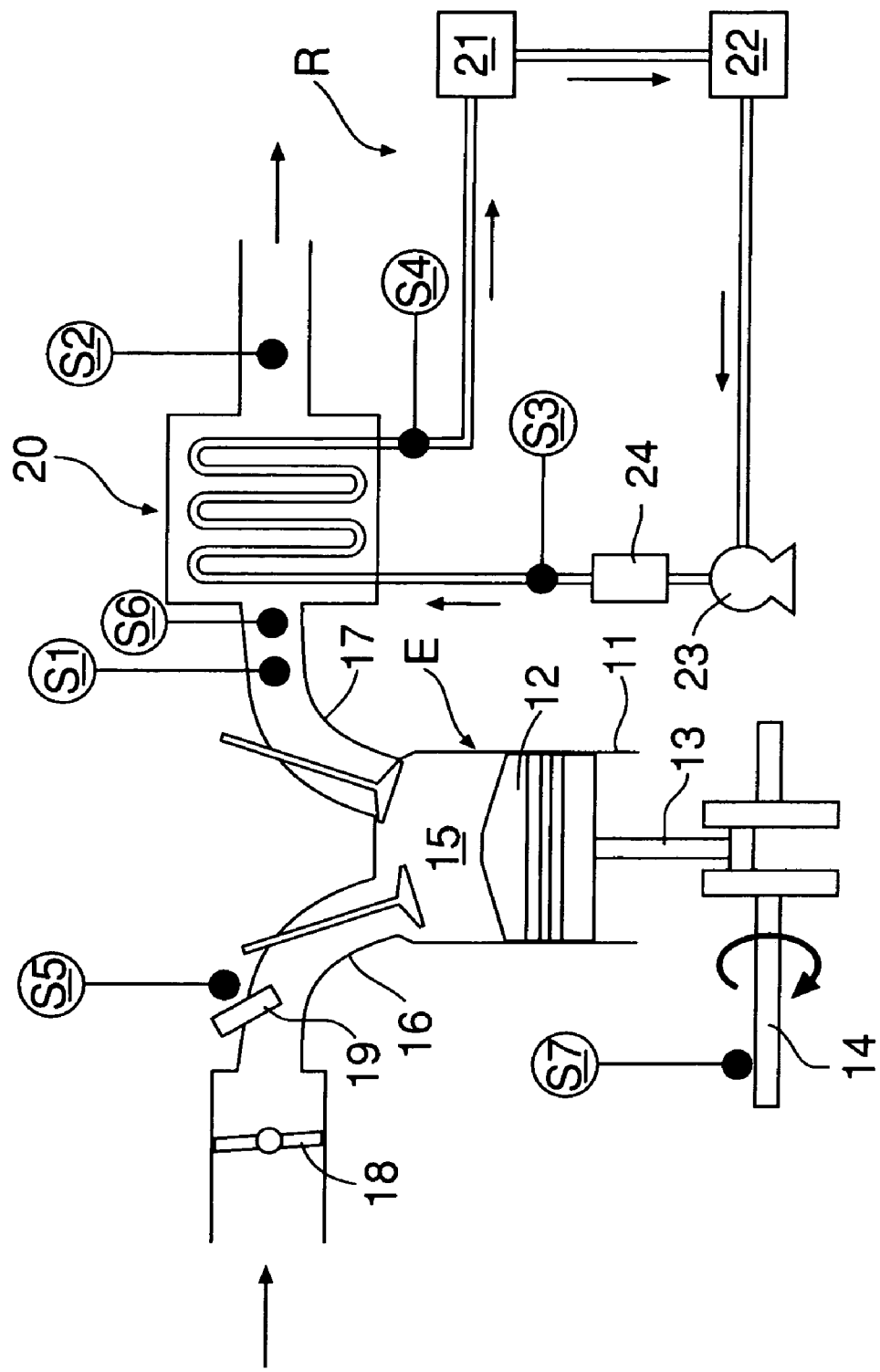
FIG. 1 to FIG. 6 illustrate a first embodiment of the present invention.
Figure 2:
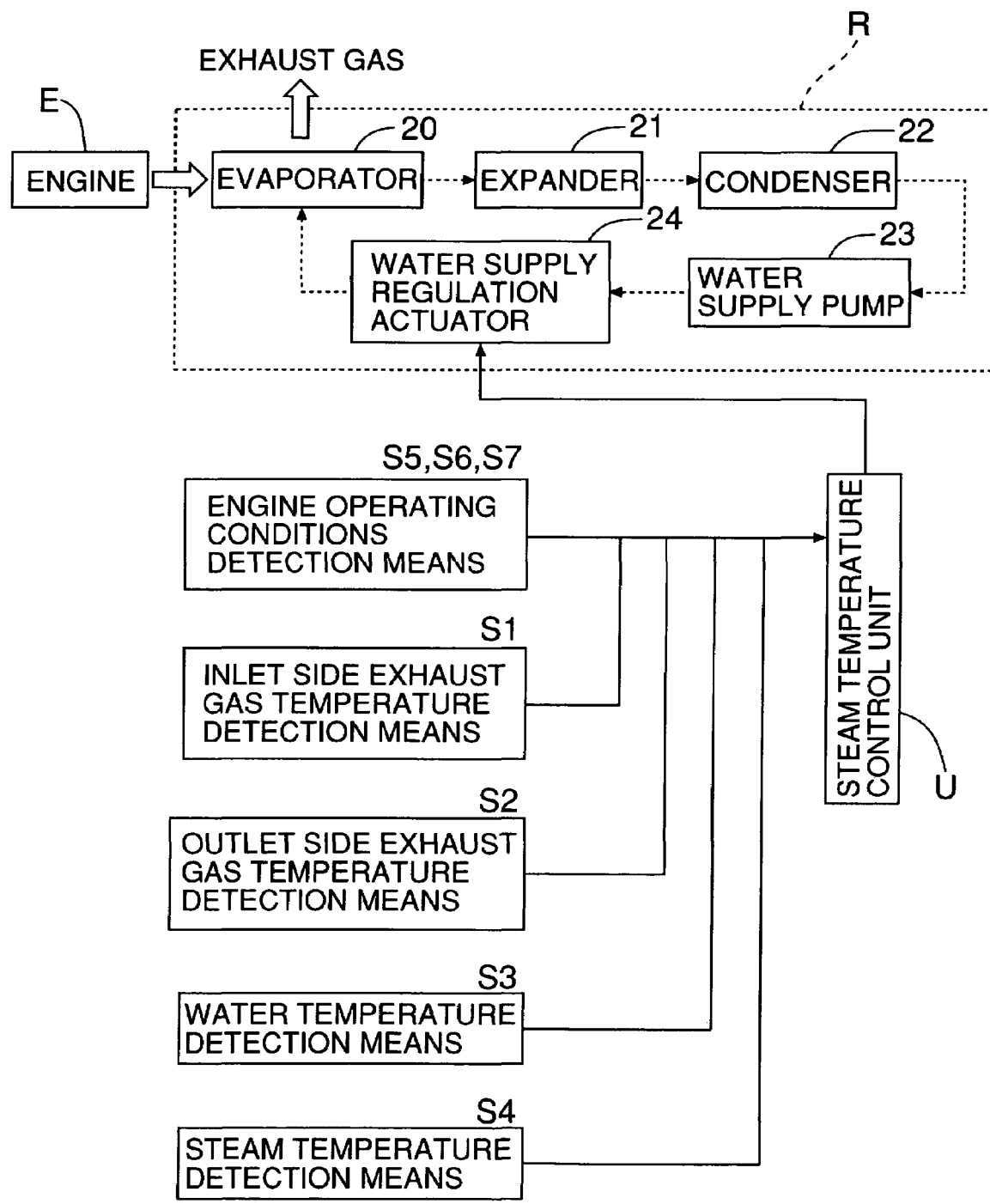

As shown in FIG. 1 and FIG. 2, a gasoline engine E includes a cylinder 11, a piston 12 that is slidably fitted in the cylinder 11, a connecting rod 13 having a little end connected to the piston 12, a crankshaft 14 connected to a big end of the connecting rod 13, a combustion chamber 15 defined between the cylinder 11 and the piston 12, an intake port 16 that communicates with the combustion chamber 15, an exhaust port 17 that communicates with the combustion chamber 15, a throttle valve 18 provided in the intake port 16, a fuel injection valve 19 provided in the intake port 16, and an evaporator 20 provided in the exhaust port 17.

A Rankine cycle system R for recovering pressure energy and thermal energy of exhaust gas of the engine E and converting them into mechanical energy includes the evaporator 20 for generating steam as a gas-phase working medium by heating water as a liquid-phase working medium using the exhaust gas of the engine E, an expander 21 for receiving a supply of high temperature, high pressure steam generated by the evaporator 20 and outputting mechanical energy, a condenser 22 for cooling decreased temperature, decreased pressure steam that has been discharged from the expander 21 so as to turn it back into water, a water supply pump 23 for supplying to the evaporator 20 water that has been discharged from the condenser 22, and a water supply regulation actuator 24 for controlling the amount of water supplied to the water supply pump 23.

In order to control the operation of the water supply regulation actuator 24, which makes the temperature of the steam generated by the evaporator 20 coincide with a target steam temperature by changing the amount of water supplied to the evaporator 20, there are provided inlet side exhaust gas temperature detection means S1 for detecting the temperature of the exhaust gas on the inlet side of the evaporator 20, outlet side exhaust gas temperature detection means S2 for detecting the temperature of the exhaust gas on the outlet side of the evaporator 20, water temperature detection means S3 for detecting the temperature of the water on the inlet side of the evaporator 20, steam temperature detection means S4 for detecting the temperature of the steam on the outlet side of the evaporator 20, fuel injection quantity detection means S5 for detecting the fuel injection quantity of the fuel injection valve 19 of the engine E, air/fuel ratio detection means S6 for detecting the air/fuel ratio of the engine E, and rotational speed detection means S7 for detecting the rotational speed of the engine E. The fuel injection quantity detection means S5, the air/fuel ratio detection means S6, and the rotational speed detection means S7 form engine operating conditions detection means. The rotational speed of the engine E referred to here means the number of revolutions per unit time.

The inlet side exhaust gas temperature detection means S1, the outlet side exhaust gas temperature detection means S2, the water temperature detection means S3, the steam temperature detection means S4, the fuel injection quantity detection means S5, the air/fuel ratio detection means S6, and the rotational speed detection means S7 are connected to steam temperature control means U for controlling the water supply regulation actuator 24.

Figure 3:
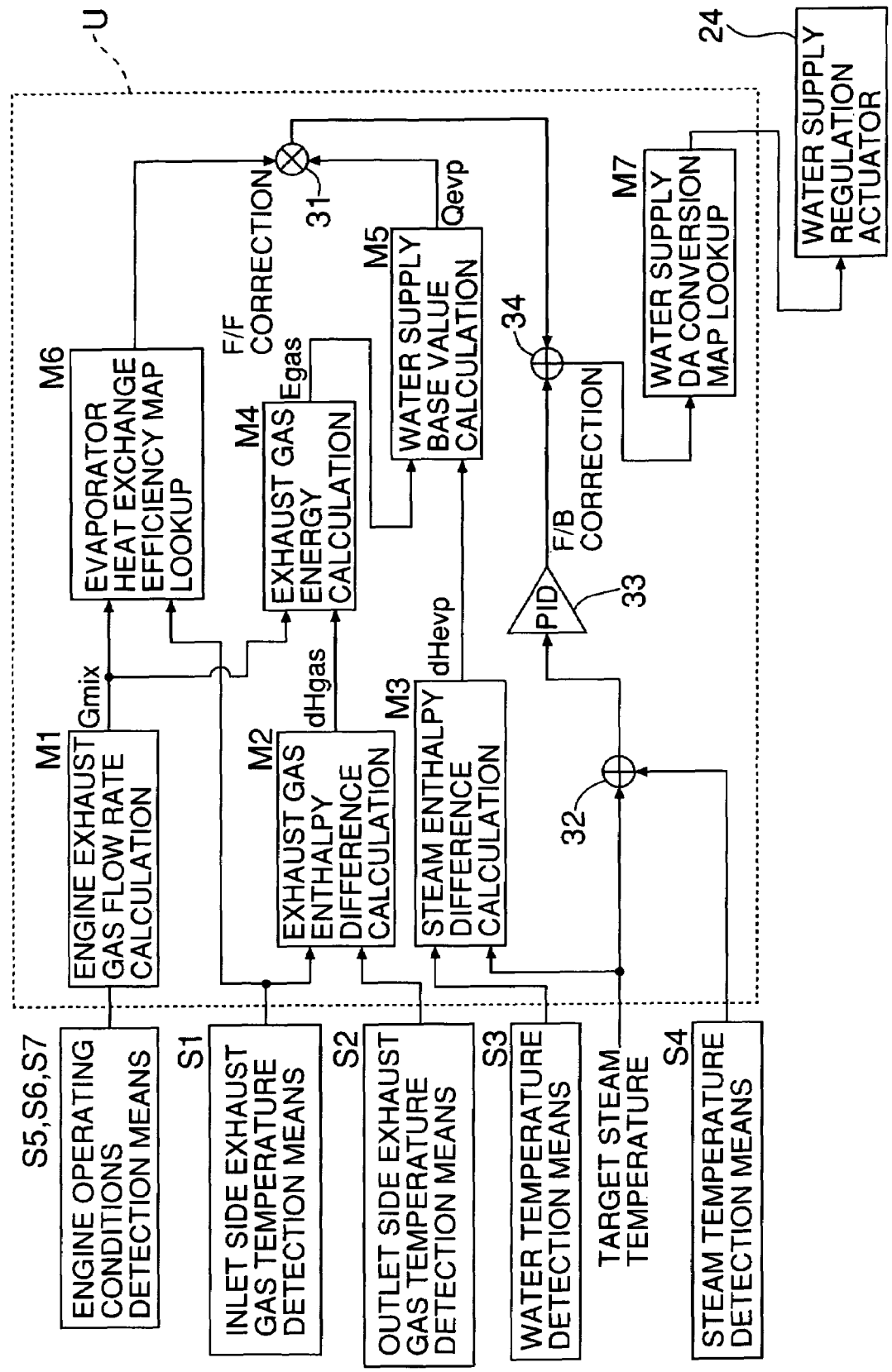
Figure 4:
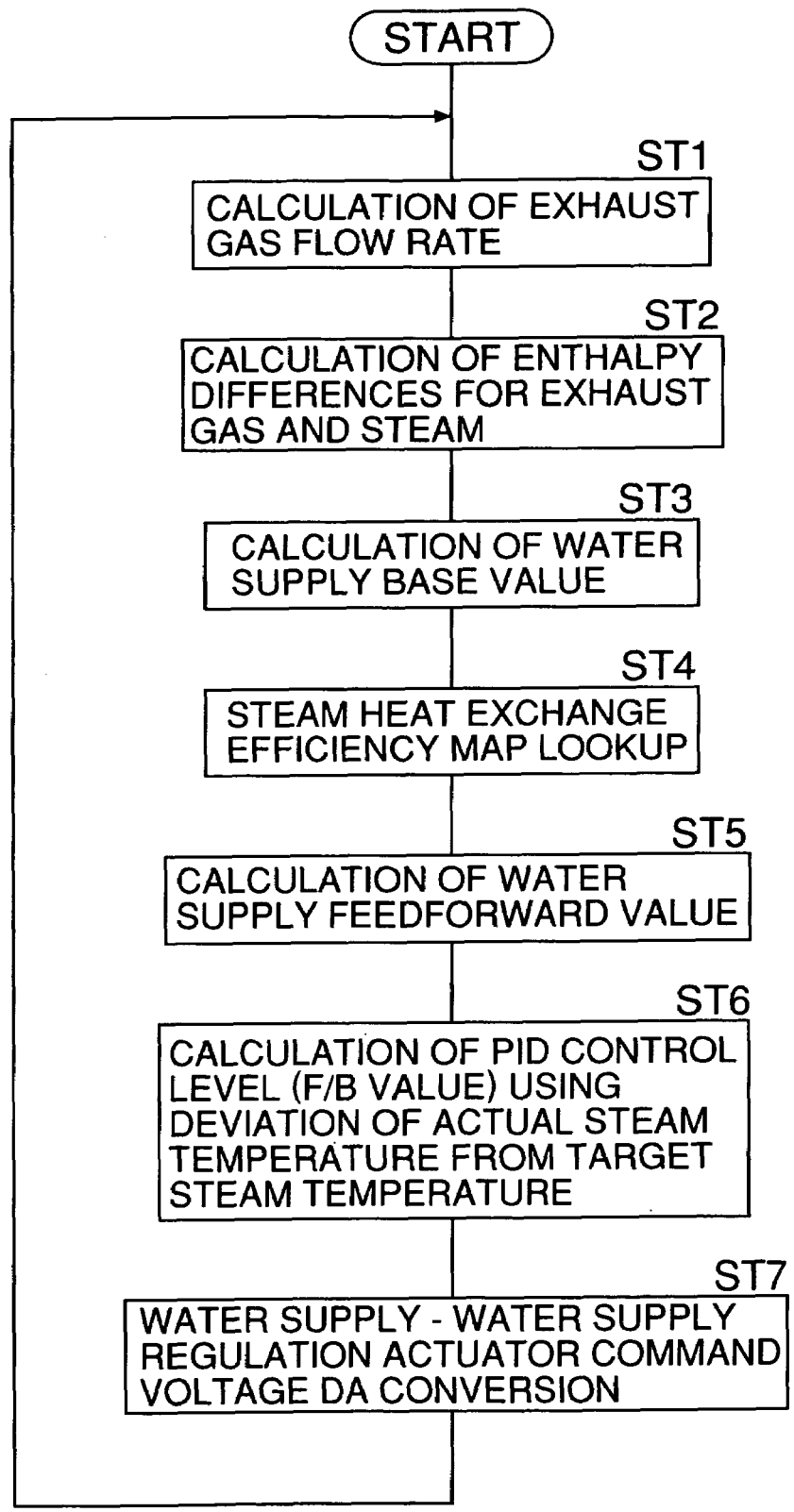

The method of control of the water supply regulation actuator 24 is now explained with reference to FIG. 3 and FIG. 4.

Firstly, in Step ST1, engine exhaust gas flow rate calculation means M1 calculates an exhaust gas flow rate Gmix of the engine E. The exhaust gas flow rate Gmix of the engine E can be calculated, using the quantity of fuel injected per revolution of the engine E detected by the fuel injection quantity detection means S5, the air/fuel ratio of the engine E detected by the air/fuel ratio detection means S6, and the rotational speed of the engine E detected by the rotational speed detection means S7, from Exhaust gas flow rate Gmix=Quantity of fuel injected per revolution of engine×(Air/fuel ratio+1)×Rotational speed of engine.

In a subsequent Step ST2, an exhaust gas enthalpy difference dHgas is calculated by exhaust gas enthalpy difference calculation means M2, and a steam enthalpy difference dHevp is calculated by steam enthalpy difference calculation means M3.

The exhaust gas enthalpy difference dHgas is the difference between a value Hgasin obtained by conversion into enthalpy of the temperature of the exhaust gas on the inlet side detected by the inlet side exhaust gas temperature detection means S1 and a value Hgasout obtained by conversion into enthalpy of the temperature of the exhaust gas on the outlet side detected by the outlet side exhaust gas temperature detection means S2, and can be given by $$dHgas = Hgasin - Hgasout.$$

The steam enthalpy difference dHevp is the difference between a value Hevpout obtained by conversion into enthalpy of a target steam temperature and a value Hevpin obtained by conversion into enthalpy of the water temperature detected by the water temperature detection means S3, and can be given by $$dHevp = Hevpout - Hevpin.$$

In a subsequent Step ST3, a water supply base value Qevp of the water supply regulation actuator 24 is calculated. Calculation of the water supply base value Qevp is carried out in two stages; in a first stage exhaust gas energy calculation means M4 calculates an exhaust gas energy Egas, using the exhaust gas flow rate Gmix and the exhaust gas enthalpy difference dHgas, from $$Egas = Gmix \times dHgas.$$

In a second stage, water supply base value calculation means M5 calculates the water supply base value Qevp, using the exhaust gas energy Egas and the steam enthalpy difference dHevp, from $$Qevp = Egas/dHevp.$$

Figure 5:
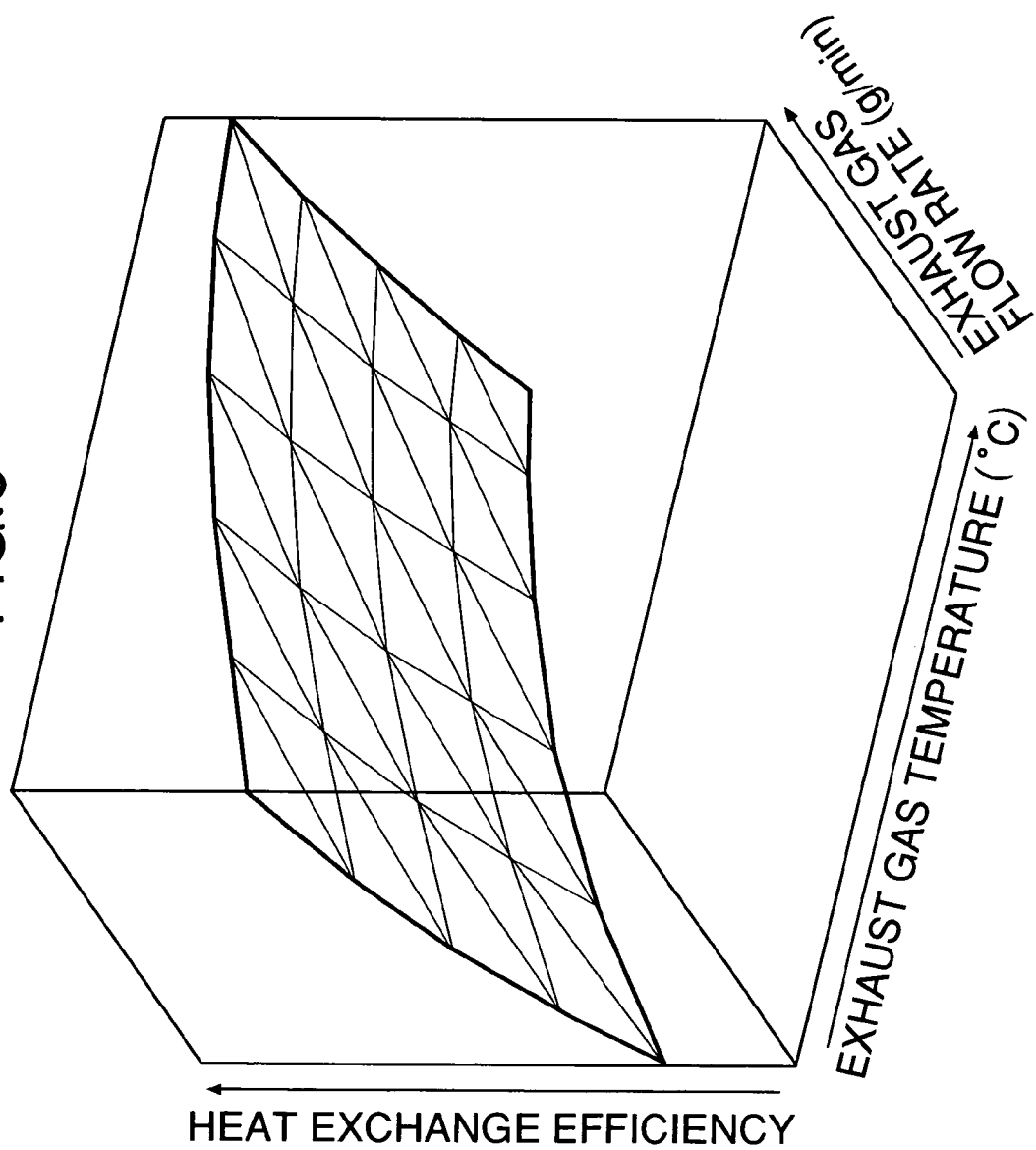

In a subsequent Step ST4, evaporator heat exchange efficiency map lookup means M6 applies the exhaust gas flow rate Gmix and the inlet side exhaust gas temperature to the map shown in FIG. 5 so as to look up the evaporator heat exchange efficiency.

In a subsequent Step ST5, multiplication means 31 calculated a water supply feedforward value by multiplying the water supply base value Qevp by the evaporator heat exchange efficiency.

In a subsequent Step ST6, subtraction means 32 calculates a deviation, from a target steam temperature, of the steam temperature detected by the steam temperature detection means S4, and addition means 34 calculates a water supply feedback value by adding the water supply feedforward value to a PID control level obtained by PID operation means 33 using the above deviation.

Figure 6:
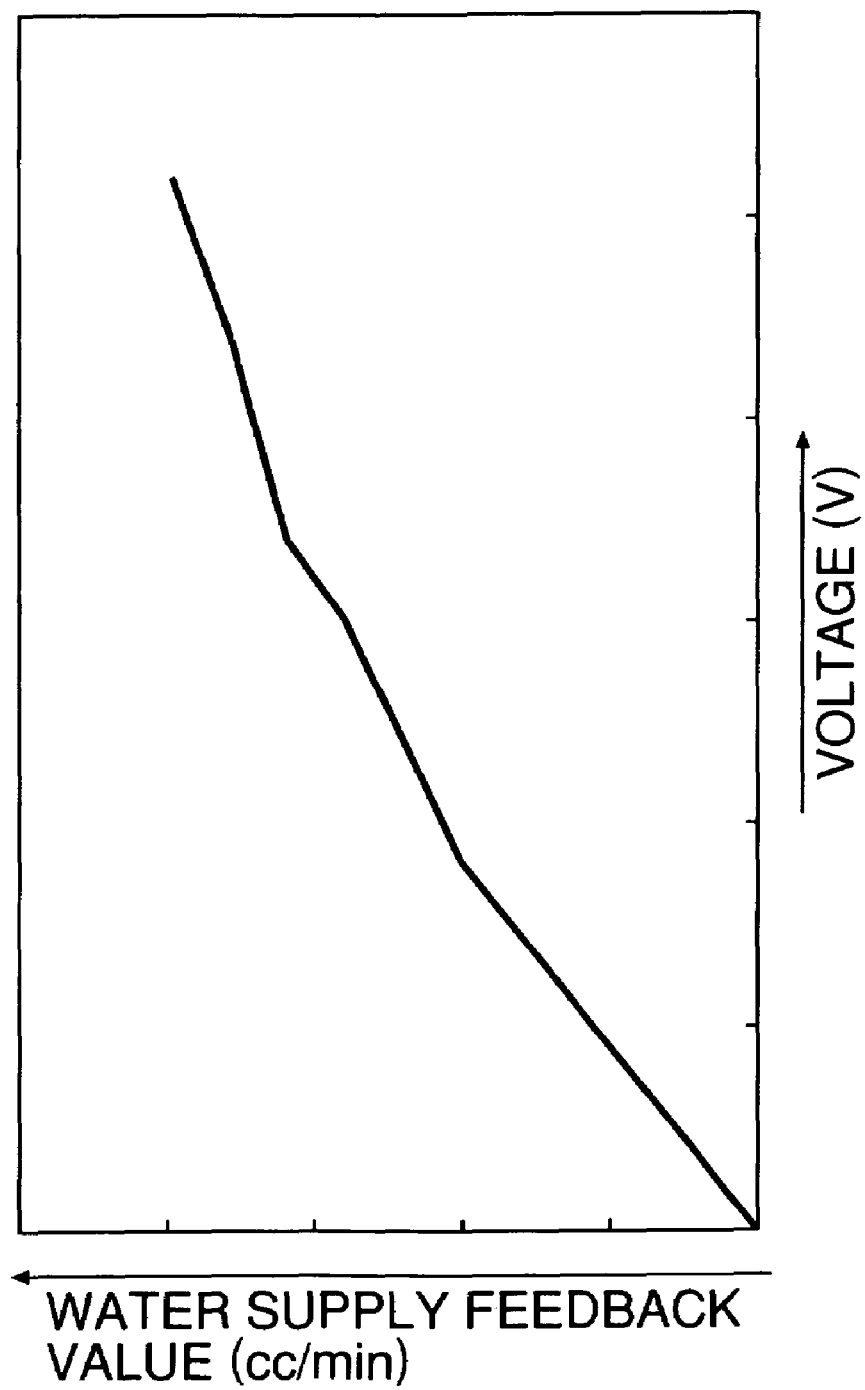

In a subsequent Step ST7, water supply DA conversion map lookup means M7 applies the water supply feedback value to the map shown in FIG. 6 so as to carry out DA conversion into voltage; this voltage is applied to the water supply regulation actuator 24 so as to control the amount of water supplied to the evaporator 20, and the steam temperature of the evaporator 20 is thus made to coincide with the target steam temperature.

As hereinbefore described, since the exhaust gas flow rate Gmix, which is a parameter with which the temperature of steam generated by the evaporator 20 is controlled at a target steam temperature, is calculated based on the fuel injection quantity, the air/fuel ratio, and the rotational speed of the engine E, when the output of the engine E is in a transition state (for example, changing from combustion at the theoretical air/fuel ratio to lean burn), the exhaust gas flow rate Gmix can be calculated with high precision. Moreover, since the exhaust gas flow rate Gmix can be calculated regardless of the specifications of the engine E, the amount of water supplied to the expander 20 can be determined using the same calculation setup data.

Figure 7:
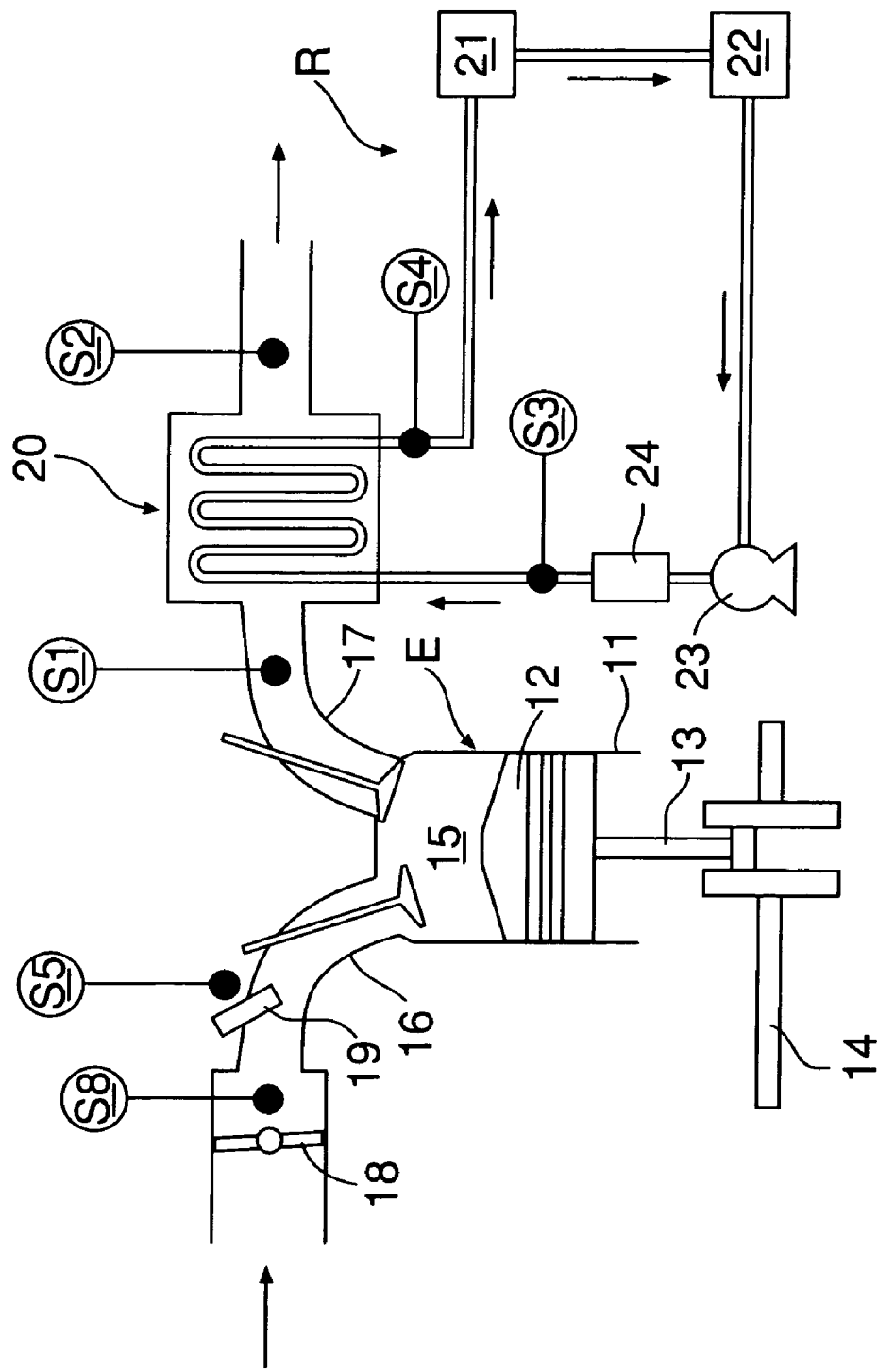
FIG. 7 is a diagram, corresponding to FIG. 1, of a second embodiment of the present invention.

A second embodiment of the present invention is now explained with reference to FIG. 7.

In the second embodiment, the method for determining the exhaust gas flow rate Gmix by calculation is different from that of the first embodiment, but the rest of the structure and the operation are the same as those of the first embodiment.

In the second embodiment, in order to determine an exhaust gas flow rate Gmix there are provided, as engine operating conditions detection means, fuel injection quantity detection means S5 for detecting the amount of fuel injected per unit time and intake air volume detection means S8 (air flow meter) for detecting the mass flow rate of the intake air. The exhaust gas flow rate Gmix is then calculated from Exhaust gas flow rate Gmix=Quantity of fuel injected per unit time×Mass flow rate of intake air.

Figure 8:
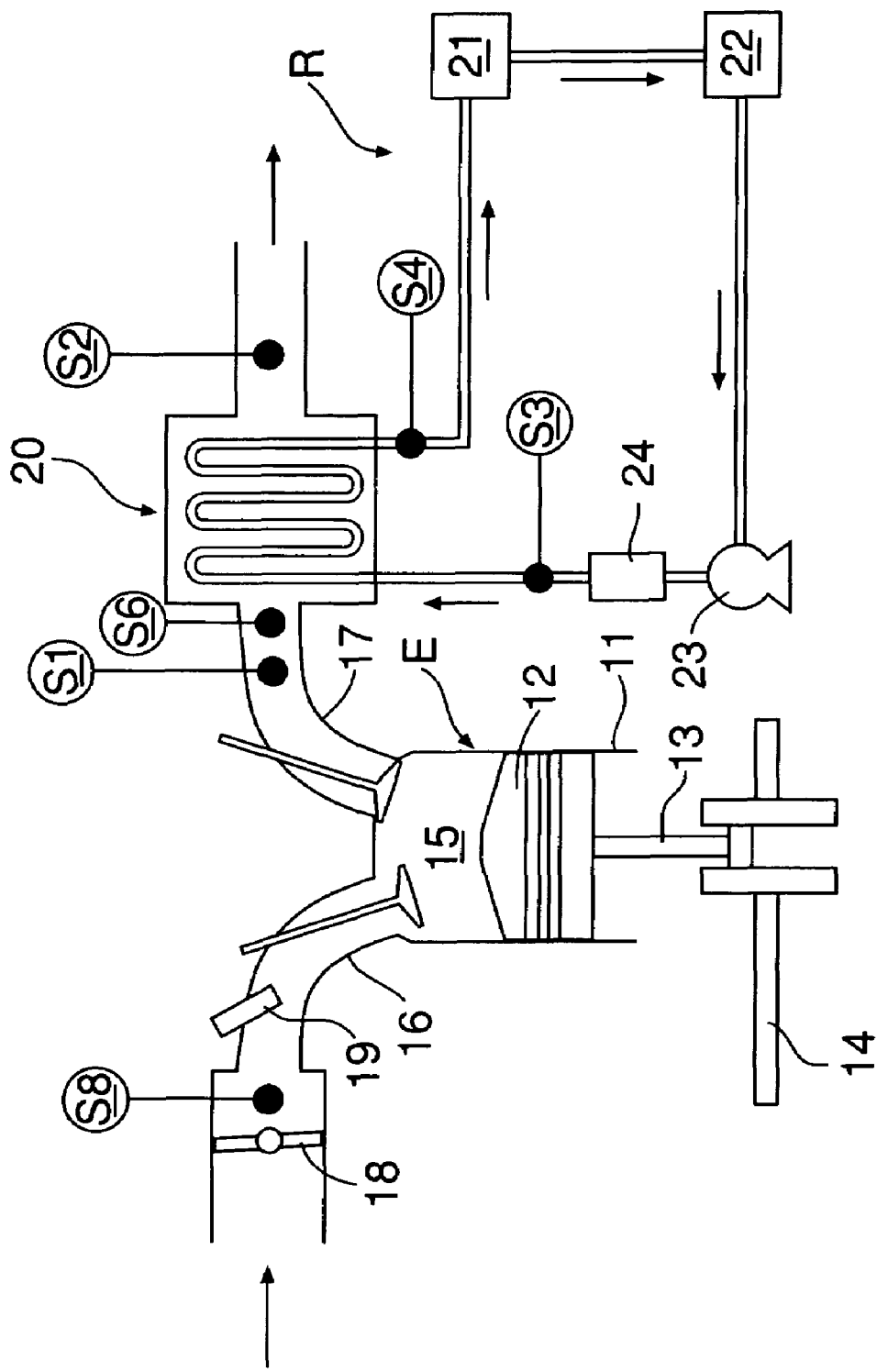
FIG. 8 is a diagram, corresponding to FIG. 1, of a third embodiment of the present invention.

A third embodiment of the present invention is now explained with reference to FIG. 8.

In the third embodiment, the method for determining the exhaust gas flow rate Gmix by calculation is different from that of the first embodiment, but the rest of the structure and the operation are the same as those of the first embodiment.

In the third embodiment, in order to determine an exhaust gas flow rate Gmix there are provided, as engine operating conditions detection means, air/fuel ratio detection means S6 for detecting an air/fuel ratio of an engine E, and intake air volume detection means S8 (air flow meter) for detecting the mass flow rate of the intake air. The exhaust gas flow rate Gmix is then calculated from Exhaust gas flow rate Gmix=Mass flow rate of intake air×{1/(Air/fuel ratio+1)}.

In accordance with these second and third embodiments, the same effects as those of the first embodiment can be achieved.

Although embodiments of the present invention are explained in detail above, the present invention can be modified in a variety of ways without departing from the scope and spirit thereof.

For example, in the embodiments, water and steam are used as the liquid-phase working medium and the gas-phase working medium, but the present invention can be applied to any other working medium.

Furthermore, the first embodiment to third embodiment can be applied not only to a gasoline engine but also to a common-rail diesel engine and, moreover, the third embodiment can be applied to a distributor type diesel engine or an in-line type diesel engine.

INDUSTRIAL APPLICABILITY

As hereinbefore described, the present invention can be desirably applied to an evaporator for a Rankine cycle system for converting the thermal energy of the exhaust gas of an engine into mechanical energy, but can also be applied to an evaporator for any other use.

What is claimed is:

1. An evaporator temperature control system that, in order to make the temperature of a gas-phase working medium generated by heating a liquid-phase working medium using exhaust gas of an engine (E) coincide with a target temperature, controls the supply of the liquid-phase working medium based on the flow rate of the exhaust gas, the temperature of the exhaust gas, the temperature of the liquid-phase working medium, and the temperature of the gas-phase working medium, the system comprising:
    fuel injection quantity detection means (S5) for detecting a fuel injection quantity of the engine (E);
    air/fuel ratio detection means (S6) for detecting an air/fuel ratio of the engine (E); and
    rotational speed detection means (S7) for detecting a rotational speed of the engine (E); the exhaust gas flow rate being determined by calculation based on the fuel injection quantity, the air/fuel ratio, and the rotational speed.

2. The evaporator temperature control system according to claim 1, wherein the fuel injection quantity detection means (S5), the air/fuel ratio detection means (S6), and the rotational speed detection means (S7) are connected to steam temperature control means U for controlling a water supply regulation actuator of a Rankine engine.

3. The evaporator temperature control system according to claim 1, wherein the engine E is a gasoline engine.

4. The evaporator temperature control system according to claim 1, wherein the engine E is a common-rail diesel engine.

5. The evaporator temperature control system according to claim 1, wherein the liquid-phase working medium is water, and the gas-phase working medium is steam.

6. The evaporator temperature control system according to claim 1, wherein the liquid-phase working medium is other than water, and the gas-phase working medium is other than steam.

7. An evaporator temperature control system that, in order to make the temperature of a gas-phase working medium generated by heating a liquid-phase working medium using exhaust gas of an engine (E) coincide with a target temperature, controls the supply of the liquid-phase working medium based on the flow rate of the exhaust gas, the temperature of the exhaust gas, the temperature of the liquid-phase working medium, and the temperature of the gas-phase working medium, the system comprising:

fuel injection quantity detection means (S5) for detecting a fuel injection quantity of the engine (E); and intake air volume detection means (S8) for detecting an intake air volume of the engine (E); the exhaust gas flow rate being determined by calculation based on the fuel injection quantity and the intake air volume.

8. An evaporator temperature control system that, in order to make the temperature of a gas-phase working medium generated by heating a liquid-phase working medium using exhaust gas of an engine (E) coincide with a target temperature, controls the supply of the liquid-phase working medium based on the flow rate of the exhaust gas, the temperature of the exhaust gas, the temperature of the liquid-phase working medium, and the temperature of the gas-phase working medium, the system comprising:

intake air volume detection means (S8) for detecting an intake air volume of the engine (E); and air/fuel ratio detection means (S6) for detecting an air/fuel ratio of the engine (E); the exhaust gas flow rate being determined by calculation based on the intake air volume and the air/fuel ratio.

\* \* \* \* \*